United States Patent
Kuo et al.

(10) Patent No.: US 11,004,180 B2
(45) Date of Patent: May 11, 2021

(54) COMPUTER DEVICE AND METHOD FOR GENERATING DYNAMIC IMAGES

(71) Applicant: Chiun Mai Communication Systems, Inc., New Taipei (TW)

(72) Inventors: Yu-Feng Kuo, New Taipei (TW); Nai-Sheng Syu, New Taipei (TW); Chun-Hsiang Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 27 days.

(21) Appl. No.: 16/667,279

(22) Filed: Oct. 29, 2019

(65) Prior Publication Data

US 2020/0143518 A1 May 7, 2020

(30) Foreign Application Priority Data

Nov. 2, 2018 (CN) .......................... 201811303471.4

(51) Int. Cl.
*G06T 5/00* (2006.01)
*G06T 7/50* (2017.01)

(52) U.S. Cl.
CPC ............... *G06T 5/002* (2013.01); *G06T 7/50* (2017.01); *G06T 2207/10028* (2013.01)

(58) Field of Classification Search
None
See application file for complete search history.

(56) References Cited

U.S. PATENT DOCUMENTS

| 10,795,022 | B2 * | 10/2020 | Shintani | G01S 17/89 |
| 2009/0285283 | A1 * | 11/2009 | Gao | G06T 5/40 |
| | | | | 375/240.08 |
| 2010/0066811 | A1 * | 3/2010 | Chang | G06T 7/593 |
| | | | | 348/43 |
| 2011/0228987 | A1 * | 9/2011 | Iwasaki | G06T 7/215 |
| | | | | 382/107 |
| 2011/0298898 | A1 * | 12/2011 | Jung | H04N 13/271 |
| | | | | 348/47 |
| 2012/0242794 | A1 * | 9/2012 | Park | H04N 13/211 |
| | | | | 348/46 |
| 2012/0306876 | A1 * | 12/2012 | Shotton | G06T 7/251 |
| | | | | 345/424 |

(Continued)

FOREIGN PATENT DOCUMENTS

| CN | 103108199 A | 5/2013 |
| CN | 103108201 A | 5/2013 |

*Primary Examiner* — Andrae S Allison
(74) *Attorney, Agent, or Firm* — ScienBiziP, P.C.

(57) ABSTRACT

A method for generating dynamic images applied to a computer device includes obtaining a depth image of a static image. A preset region of the depth image is converted into a histogram and an average depth value D is calculated therefrom. A first depth value d1 and a second depth value d2 are determined from the histogram according to the average depth value D. M numbers of third depth values d3 are calculated according to the first depth value d1 and the second depth value d2. Once M number of blurred images are generated according to each M number of third depth values d3, the M number of blurred images are played back according to a magnitude of the third depth value d3 corresponding to each of the M number of blurred images.

16 Claims, 4 Drawing Sheets

(56) References Cited

U.S. PATENT DOCUMENTS

| | | | |
|---|---|---|---|
| 2013/0106841 A1* | 5/2013 | Ko | H04N 13/128 345/419 |
| 2015/0003725 A1* | 1/2015 | Wan | G06T 7/11 382/154 |
| 2015/0326845 A1* | 11/2015 | Liang | G06T 7/174 382/154 |
| 2016/0063714 A1* | 3/2016 | Middleton | G06T 7/62 382/195 |

* cited by examiner

COMPUTER DEVICE AND METHOD FOR GENERATING DYNAMIC IMAGES

CROSS-REFERENCE TO RELATED APPLICATIONS

This application claims priority to CN Application No. 201811303471.4 filed on Nov. 2, 2018, the contents of which are incorporated by reference herein.

FIELD

The subject matter herein generally relates to image processing technology, and particularly to a computer device and a method for generating a dynamic image.

BACKGROUND

This section is intended to provide a context for embodiments of the invention set forth in the claims. The description herein is not admitted to be prior art as it is included in this section.

There are currently many ways to obtain depth images. For example, a depth-sensing camera may be used for photographing depth images. In another example, the depth image can be obtained by establishing a spatial model, executing edge detection, calculating vanishing points, or the like on a static image. However, there are few solutions that utilize depth images to obtain a dynamic image.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
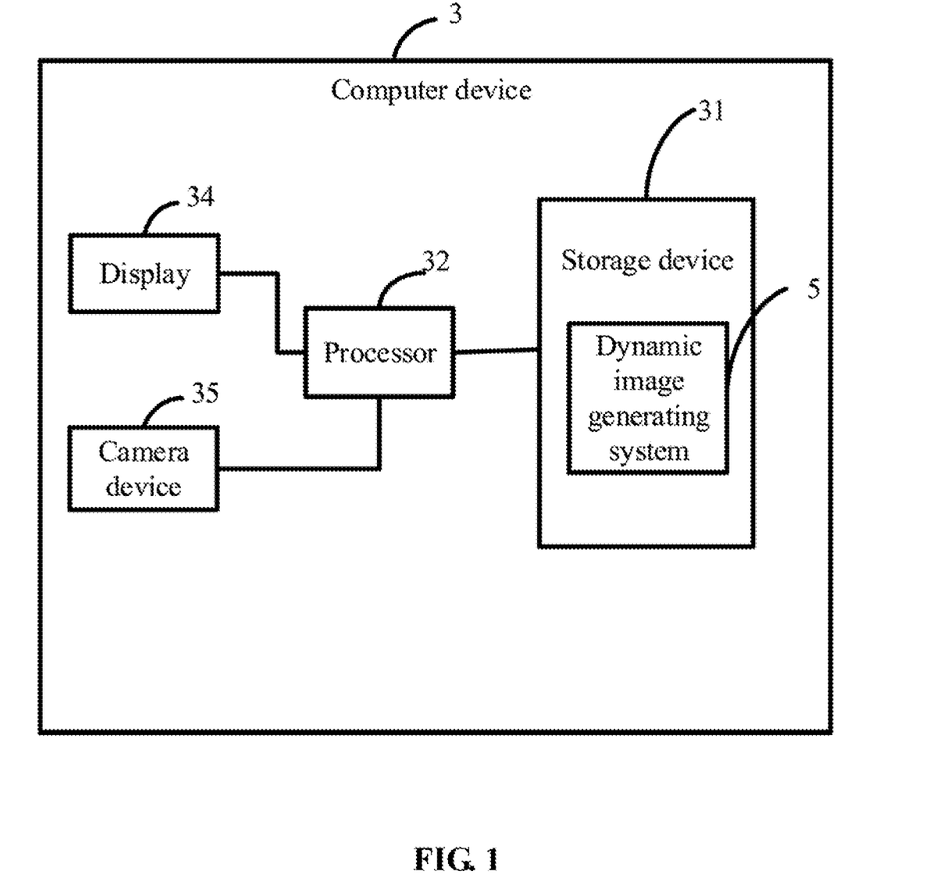
FIG. 1 is a block diagram of an embodiment of a computer device including a dynamic image generating system.

FIG. 1 illustrates an embodiment of a computer device including a dynamic image generating system. Depending on the embodiment, computer device 3 can include, but is not limited to, a storage device 31, at least one processor 32, a display 34, and a camera device 35. The above components are electrically connected with each other.

It should be understood by those skilled in the art that the structure of the computer device 3 shown in FIG. 1 does not constitute a limitation of the embodiment of the present disclosure, and the computer device 3 may further include more or less other hardware or software than the illustration, or have a different layout.

Although not shown, the computer device 3 may further include a power supply (such as a battery) for powering various components. Preferably, the power supply may be logically connected to the at least one processor 32 through a power management device, thereby, the power management device manages functions such as charging, discharging, and power management. The power supply may include one or more a DC or AC power source, a recharging device, a power failure detection circuit, a power converter or inverter, a power status indicator, and the like. The computer device 3 may further include various devices, such as a WI-FI module, sensors, and the like.

In at least one embodiment, the storage device 31 can be used to store program codes of computer programs and various data, such as the dynamic image generating system 120 installed in the computer device 3. The storage device 31 can automatically access the computer programs or data. The storage device 31 can include a read-only memory (ROM), a random access memory (RAM), a programmable read-only memory (PROM), an erasable programmable read only memory (EPROM), a one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other non-transitory storage medium readable by the computer device 3 that can be used to carry or store data.

In at least one embodiment, the at least one processor 32 may be composed of an integrated circuit, for example, may be composed of a single packaged integrated circuit, or may be composed of multiple integrated circuits having same function or different functions. The at least one processor 32 can include one or more central processing units (CPU), a microprocessor, a digital processing chip, a graphics processor, and various control chips. The at least one processor 32 is a control unit of the computer device 3, which connects various components of the computer device 3 using various interfaces and lines. By running or executing a computer program or modules stored in the storage device 31, and by invoking data stored in the storage device 31, the at least one processor 32 can perform functions of the computer device 3 and process data of the computer device 3. For example, the at least one processor 32 can execute a dynamic image generating system 120 stored in the storage device 31 so as to generate dynamic images.

In at least one embodiment, the display 34 can be used to display information entered by a user or provide information of the computer device 3 to the user, and can provide various graphical user interfaces of the computer device 3. Those various graphical user interfaces can be graphical, text, icon, video, or a combination thereof. The display 34 may include a display panel such as a liquid crystal display (LCD) panel or an Organic Light-Emitting Diode (OLED) display panel.

In some embodiments, the camera device 35 can be a depth camera or a dual camera having a function of simulating human binocular vision. The computer device 3 can capture a depth image using the camera device 35. In the present embodiment, the depth image is also referred to as a range image. A distance from an image collector (e.g., the camera device 35) to each point in a scene is referred to as a depth value of each point. Depth information of the depth image includes the depth value of each pixel point in the depth image, and the depth value can be represented using a gray scale range (for example, 0~255). In at least one embodiment, a grayscale value 0 indicates that the point in the scene is closest to the image collector, and the grayscale value 255 indicates that the point in the scene is farthest from the image collector.

Figure 2:
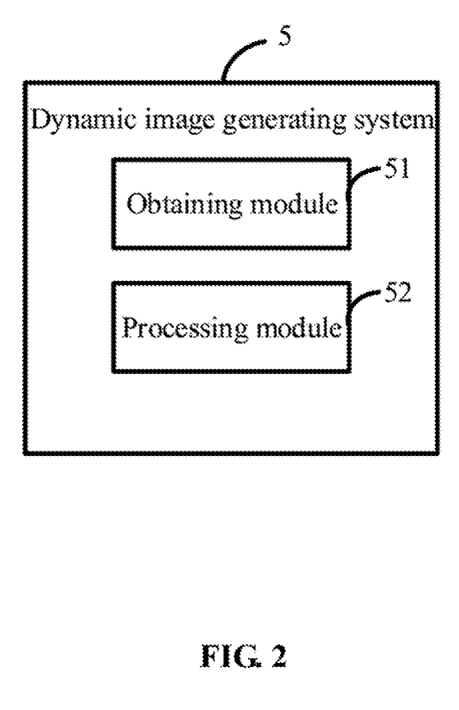
FIG. 2 is a block diagram of an embodiment of modules of the dynamic image generating system included in the computer device of FIG. 1.

In at least one embodiment, the dynamic image generating system 120 can include a plurality of modules. As shown in FIG. 2, the plurality of modules can include, but is not limited to, an obtaining module 51 and a processing module 52. The modules 51-52 can include computerized instructions in a form of one or more computer-readable programs that can be stored in a non-transitory computer-readable medium (e.g., the storage device 31 of the computer device 3), and executed by the at least one processor 32 of the computer device 3 to implement dynamic image generating function described in FIG. 3.

In at least one embodiment, the dynamic image generating system 120 can be integrated into the at least one processor 32. In other embodiments, the dynamic image generating system 120 may also be independent of the processor 32.

Figure 3:
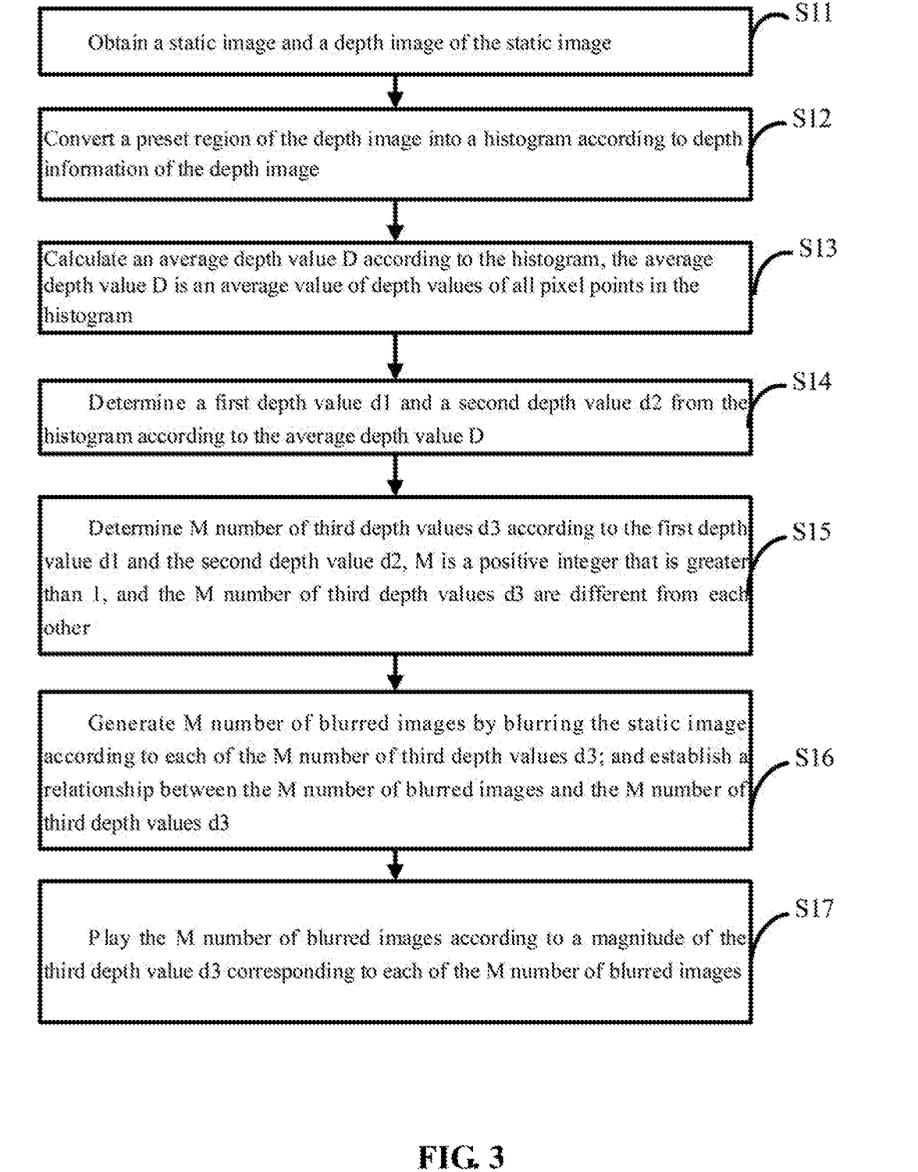
FIG. 3 is a flowchart of an embodiment of a method for generating dynamic images.

FIG. 3 illustrates a flowchart of a method of generating a dynamic image. In an example embodiment, the method is performed by execution of computer-readable software program codes or instructions by the at least one processor 32 of the computer device 3.

Referring to FIG. 3, the method is provided by way of example, as there are a variety of ways to carry out the method. The method described below can be carried out using the configurations illustrated in FIG. 1, for example, and various elements of these figures are referenced in explanation of method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S11.

At block S11, the obtaining module 51 can obtain a static image, and can obtain a depth image of the static image.

In at least one embodiment, the obtaining module 51 can obtain the static image using the camera device 35. The obtaining module 51 can obtain the depth image of the static image by establishing a spatial model, executing edge detection, calculating vanishing points, and the like on the static image. In other embodiments, the obtaining module 51 can also acquire the static image and the depth image of the static image from a server or another computer device, i.e., the static image and the depth image of the static image can be pre-stored in the server or pre-stored in another computer device.

At block S12, the processing module 52 can convert a preset region of the depth image into a histogram according to depth information of the depth image. A horizontal axis of the histogram represents the depth value of preset region, and a vertical axis represents a number of pixel points corresponding to each depth value. In at least one embodiment, $d_{min}$ represents the minimum value of a horizontal coordinate of the histogram, and $d_{max}$ represents the maximum value of a horizontal coordinate of the histogram. For example, $d_{min}$ can be equal to 0 and $d_{max}$ can be equal to 255. In other embodiments, $d_{min}$ and $d_{max}$ can be changed to be other values.

In at least one embodiment, the depth information of the depth image refers to a depth value of each pixel point of the depth image.

In at least one embodiment, the preset region centers on a center of the depth image, and has a preset size and a preset shape. In at least one embodiment, the preset shape can be a rectangle, a square, a circle, or the like. For example, it is assumed that the preset shape is the rectangle, the preset region can be an area which centers on the center of the depth image, and has a preset length and a preset width.

Figure 4:
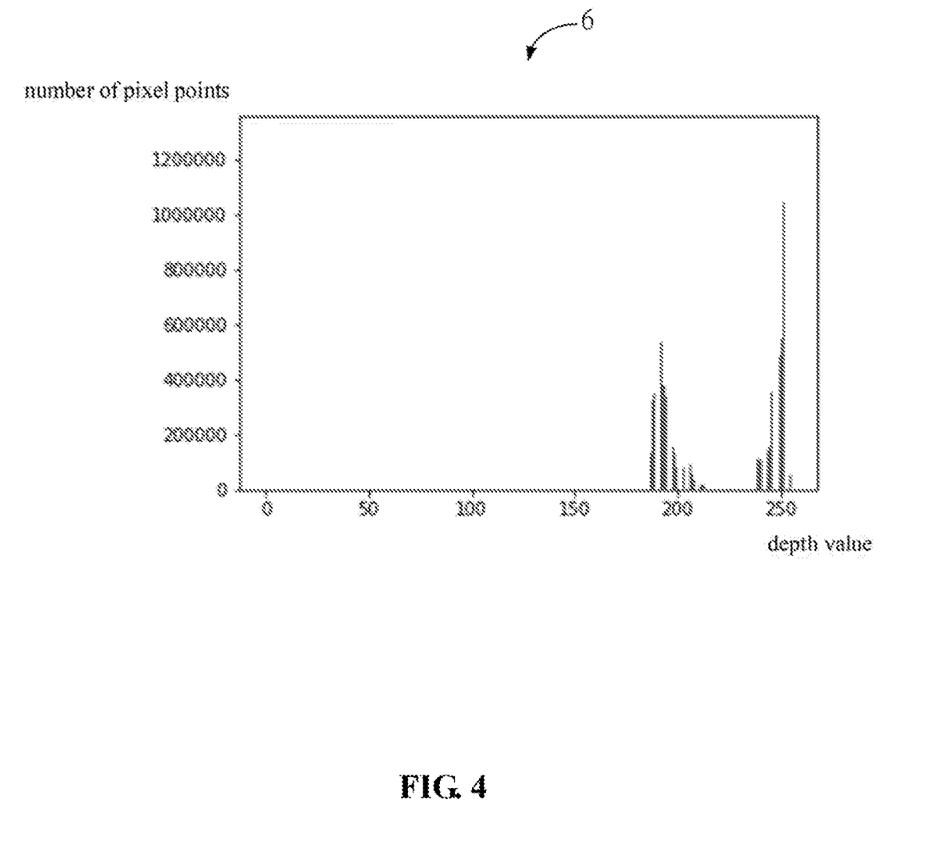
FIG. 4 illustrates an embodiment of generating a histogram according to depth information of a static image.

For example, the processing module 52 can convert the preset region of the depth image into the histogram 6 shown in FIG. 4 according to the depth information of the depth image. The horizontal axis of the histogram 6 represents the depth value, and the vertical axis of the histogram 6 represents the number of pixel points corresponding to each depth value.

At block S13, the processing module 52 can calculate an average depth value D according to the histogram. The average depth value D can be an average value of depth values of all pixel points in the histogram (i.e., in the preset region).

In at least one embodiment, the processing module 52 can multiply each depth value displayed on the histogram by a number of pixel points corresponding to each depth value, thus a number of products are obtained. The processing module 52 can calculate a sum of the number of products. The processing module 52 can divide the sum by a total number of pixel points of the preset region, thus the average depth value D is obtained.

At block S14, the processing module 52 can determine a first depth value d1 and a second depth value d2 from the histogram according to the average depth value D.

In a first embodiment, the determining of the first depth value d1 and the second depth value d2 from the histogram according to the average depth value D includes:

(a1) determining whether there is a first depth value d1 satisfying a first condition in the histogram. If there is the first depth value d1 satisfying the first condition in the histogram, performing (b1). If there is no first depth value d1 satisfying the first condition in the histogram, performing (c1).

In at least one embodiment, the first condition refers to d1 being greater than $d_{min}$ and less than D; the number of pixel points corresponding to d1 being greater than or equal to the number of pixel points corresponding to each depth value between $d_{min}$ and D, and the number of pixel points corresponding to d1 being greater than a pre-set value (for example, 180).

(b1) If there is the first depth value d1 satisfying the first condition in the histogram, the processing module 52 can determine that the second depth value d2 is $d_{max}$.

(c1) if there is no first depth value d1 satisfying the first condition in the histogram, the processing module 52 can search for the first depth value d1 in the histogram according to a second condition (i.e., the first depth value d1 needs to satisfy the second condition).

The second condition refers to d1 being greater than D but is less than $d_{max}$, the number of pixel points corresponding to d1 being greater than or equal to the number of pixel points corresponding to each depth value between D and $d_{max}$.

In at least one embodiment, if there is the first depth value d1 satisfying the second condition in the histogram, the processing module 52 can determine that the second depth value d2 is $d_{min}$.

In a second embodiment, the determining of the first depth value d1 and the second depth value d2 from the histogram according to the average depth value D includes:

(a2) determining whether there is the first depth value d1 satisfying a third condition in the histogram. If there is the first depth value d1 satisfying the third condition in the histogram, performing (b2). If there is no first depth value d1 satisfying the third condition in the histogram, performing (c2).

In at least one embodiment, the third condition refers to d1 being greater than D and is less than $d_{max}$, the number of pixel points corresponding to d1 being greater than or equal to the number of pixel points corresponding to each depth value between D and $d_{max}$, and the number of pixel points corresponding to d1 being greater than the preset value (for example, 180).

(b2) If there is the first depth value d1 satisfying the third condition in the histogram, the processing module 52 can determine that the second depth value d2 is $d_{min}$.

(c2) if there is no first depth value d1 satisfying the third condition in the histogram, the processing module 52 can search for the first depth value d1 in the histogram according to a fourth condition (i.e., the first depth value d1 needs to satisfy the fourth condition).

In at least one embodiment, the fourth condition refers to d1 being greater than $d_{min}$ but less than D, and the number of pixel points corresponding to d1 being greater than or equal to the number of pixel points corresponding to each depth value between $d_{min}$ and D.

In at least one embodiment, if there is the first depth value d1 satisfying the fourth condition in the histogram, the processing module 52 can determine that the second depth value d2 is $d_{max}$.

At block S15, the processing module 52 can determine M number of third depth values d3 according to the first depth value d1 and the second depth value d2. The M number of third depth values d3 are different from each other.

In at least one embodiment, M is a positive integer that is greater than one. M can be a preset value or can be set by the processing module 52 according to the user input.

In at least one embodiment, the M number of third depth values d3 forms an arithmetic progression, a tolerance value of the arithmetic progression equals a value that is obtained by dividing a special value by (M−1), and the special value is an absolute value of a difference between the first depth value d1 and the second depth value d2. In at least one embodiment, a minimum depth value of the M number of third depth values d3 is the smaller of d1 and d2, and a maximum depth value of the M number of third depth values d3 is the greater of d1 and d2.

At block S16, the processing module 52 can generate M number of blurred images by blurring the static image according to each of the M number of third depth values d3. The processing module 52 can further establish a relationship between the M number of blurred images and the M number of third depth values d3. In at least one embodiment, when the processing module 52 blurs the static image according to a certain third depth value d3, the processing module 52 blurs the pixel points of which the depth value is not equal to the certain third depth value d3, not blurs the pixel point of which the depth value is equal to the certain third depth value d3, thus generating a blurred image corresponding to the certain third depth value d3. It should be noted that the certain third depth value d3 can be any one of the M number of third depth values d3. By such method therefore, the processing module 52 can blur the static image according to each of the M third depth values d3, and can generate the M number of blurred images.

In at least one embodiment, when the processing module 52 blurs the static image according to the certain third depth value d3, and a certain pixel point of the static image needs to be blurred (the certain pixel point can be any one pixel point of the static image, and the depth value of the certain pixel point is not equal to the certain third depth value d3), a degree of blurring of the certain pixel point is proportional to a difference value between the depth value of the certain pixel point and the certain third depth value d3. That is, the greater the difference value, the higher is the degree of blurring of the certain pixel point.

At block S17, the processing module 52 can play the M number of blurred images according to a magnitude of the third depth value d3 corresponding to each of the M number of blurred images, thereby play of dynamic images is realized.

For example, it is assumed that M equals 3, the 3 blurred images respectively corresponding to M1, M2, and M3, M2 is greater than M1, but is less than M3. Then the processing module 52 can first play the blurred image corresponding to M1, then play the blurred image corresponding to M2, and lastly play the blurred image corresponding to M3. Alternatively, the processing module 52 can first play the blurred image corresponding to M3, then play the blurred image corresponding to M2, and lastly play the blurred image corresponding to M1.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:
1. A dynamic image generating method applied to a computer device, the method comprising:
 obtaining a static image and a depth image of the static image;

converting a preset region of the depth image into a histogram according to depth information of the depth image;

calculating an average depth value D according to the histogram, wherein the average depth value D is an average value of depth values of all pixel points in the histogram;

determining a first depth value d1 and a second depth value d2 from the histogram according to the average depth value D;

determining M number of third depth values d3 according to the first depth value d1 and the second depth value d2, wherein M is a positive integer that is greater than 1, and the M number of third depth values d3 are different from each other;

generating M number of blurred images by blurring the static image according to each of the M number of third depth values d3;

establishing a relationship between the M number of blurred images and the M number of third depth values d3; and playing the M number of blurred images according to a magnitude of the third depth value d3 corresponding to each of the M number of blurred images.

2. The method according to claim 1, wherein a horizontal axis of the histogram represents the depth value of the preset region, and a vertical axis represents a number of pixel points corresponding to each of the depth values.

3. The method according to claim 1, wherein the preset region centers on a center of the depth image, and has a preset size and a preset shape.

4. The method according to claim 1, wherein the calculating of the average depth value D according to the histogram comprises:

multiplying each depth value displayed on the histogram by a number of pixel points corresponding to each of the depth values, thus a plurality of products are obtained;

calculating a sum of the plurality of products;

dividing the sum by a total number of pixel points of the preset region, thus the average depth value D is obtained.

5. The method according to claim 1, wherein the determining of the first depth value d1 and the second depth value d2 from the histogram according to the average depth value D comprises:

determining whether there is the first depth value d1 satisfying a first condition in the histogram, wherein the first condition refers to: d1 is greater than $d_{min}$ and is less than D; the number of pixel points corresponding to d1 is greater than or equal to the number of pixel points corresponding to each of the depth values between $d_{min}$ and D; and the number of pixel points corresponding to d1 is greater than a pre-set value, wherein $d_{min}$ represents a minimum value of a horizontal coordinate of the histogram;

determining the second depth value d2 is $d_{max}$ when there is the first depth value d1 satisfying the first condition in the histogram, wherein $d_{max}$ represents a maximum value of the horizontal coordinate of the histogram;

searching for the first depth value d1 in the histogram according to a second condition when there is no first depth value d1 satisfying the first condition in the histogram, wherein the second condition refers to: d1 is greater than D but is less than $d_{max}$; the number of pixel points corresponding to d1 is greater than or equal to the number of pixel points corresponding to each of the depth values between D and $d_{max}$; and determining the second depth value d2 is $d_{min}$ when there is the first depth value d1 satisfying the second condition in the histogram.

6. The method according to claim 1, wherein the determining of the first depth value d1 and the second depth value d2 from the histogram according to the average depth value D comprises:

determining whether there is the first depth value d1 satisfying a third condition in the histogram, wherein the third condition refers to: d1 is greater than D and is less than $d_{max}$; the number of pixel points corresponding to d1 is greater than or equal to the number of pixel points corresponding to each of the depth values between D and $d_{max}$; and the number of pixel points corresponding to d1 is greater than a preset value, wherein $d_{max}$ represents the maximum value of a horizontal coordinate of the histogram;

determining the second depth value d2 is $d_{min}$ when there is the first depth value d1 satisfying the third condition in the histogram, wherein $d_{min}$ represents a minimum value of the horizontal coordinate of the histogram;

search for the first depth value d1 in the histogram according to a fourth condition when there is no first depth value d1 satisfying the third condition in the histogram, wherein the fourth condition refers to: d1 is greater than $d_{min}$ but is less than D; the number of pixel points corresponding to d1 is greater than or equal to the number of pixel points corresponding to each of the depth values between $d_{min}$ and D; and determining the second depth value d2 is $d_{max}$ when there is the first depth value d1 satisfying the fourth condition in the histogram.

7. The method according to claim 1, wherein the M number of third depth values d3 form an arithmetic progression, a tolerance value of the arithmetic progression equals a value that is obtained by dividing a special value by (M−1), and the special value is an absolute value of a difference between the first depth value d1 and the second depth value d2; wherein a minimum depth value of the M number of third depth values d3 is a smaller one of d1 and d2, and a maximum depth value of the M number of third depth values d3 is a bigger one of d1 and d2.

8. The method according to claim 1, wherein the blurring of the static image according to each of the M number of third depth values d3 comprises: blurring the pixel point of which the depth value is not equal to the each of the M number of third depth values d3, and not blurring the pixel point of which the depth value is equal to the each of the M number of third depth values d3, and generating a blurred image corresponding to the each of the M number of third depth values d3, wherein a degree of blurring of any one pixel point of the static image is proportional to a difference value between the depth value of the any one pixel point and the each of the M number of third depth values d3.

9. A computer device comprising:

a storage device;

at least one processor; and the storage device storing one or more programs, which when executed by the at least one processor, cause the at least one processor to:

obtain a static image and a depth image of the static image;

convert a preset region of the depth image into a histogram according to depth information of the depth image;

calculate an average depth value D according to the histogram, wherein the average depth value D is an average value of depth values of all pixel points in the histogram;

determine a first depth value d1 and a second depth value d2 from the histogram according to the average depth value D;

determine M number of third depth values d3 according to the first depth value d1 and the second depth value d2, wherein M is a positive integer that is greater than 1, and the M number of third depth values d3 are different from each other;

generate M number of blurred images by blurring the static image according to each of the M number of third depth values d3;

establish a relationship between the M number of blurred images and the M number of third depth values d3; and play the M number of blurred images according to a magnitude of the third depth value d3 corresponding to each of the M number of blurred images.

10. The computer device according to claim 9, wherein a horizontal axis of the histogram represents the depth value of the preset region, and a vertical axis represents a number of pixel points corresponding to each of the depth values.

11. The computer device according to claim 9, wherein the preset region centers on a center of the depth image, and has a preset size and a preset shape.

12. The computer device according to claim 9, wherein the calculating of the average depth value D according to the histogram comprises:

multiplying each of the depth values displayed on the histogram by a number of pixel points corresponding to each of the depth values, thus a plurality of products are obtained;

calculating a sum of the plurality of products;

dividing the sum by a total number of pixel points of the preset region, thus the average depth value D is obtained.

13. The computer device according to claim 9, wherein the determining of the first depth value d1 and the second depth value d2 from the histogram according to the average depth value D comprises:

determining whether there is the first depth value d1 satisfying a first condition in the histogram, wherein the first condition refers to: d1 is greater than $d_{min}$ and is less than D; the number of pixel points corresponding to d1 is greater than or equal to the number of pixel points corresponding to each depth value between $d_{min}$ and D; and the number of pixel points corresponding to d1 is greater than a pre-set value, wherein $d_{min}$ represents a minimum value of a horizontal coordinate of the histogram;

determining the second depth value d2 is $d_{max}$ when there is the first depth value d1 satisfying the first condition in the histogram, wherein $d_{max}$ represents a maximum value of the horizontal coordinate of the histogram;

searching for the first depth value d1 in the histogram according to a second condition when there is no first depth value d1 satisfying the first condition in the histogram, wherein the second condition refers to: d1 is greater than D but is less than $d_{max}$; the number of pixel points corresponding to d1 is greater than or equal to the number of pixel points corresponding to each depth value between D and $d_{max}$; and determining the second depth value d2 is $d_{min}$ when there is the first depth value d1 satisfying the second condition in the histogram.

14. The computer device according to claim 9, wherein the determining of the first depth value d1 and the second depth value d2 from the histogram according to the average depth value D comprises:

determining whether there is the first depth value d1 satisfying a third condition in the histogram, wherein the third condition refers to: d1 is greater than D and is less than $d_{max}$; the number of pixel points corresponding to d1 is greater than or equal to the number of pixel points corresponding to each of the depth values between D and $d_{max}$; and the number of pixel points corresponding to d1 is greater than a preset value, wherein $d_{max}$ represents the maximum value of a horizontal coordinate of the histogram;

determining the second depth value d2 is $d_{min}$ when there is the first depth value d1 satisfying the third condition in the histogram, wherein $d_{min}$ represents a minimum value of a horizontal coordinate of the histogram;

search for the first depth value d1 in the histogram according to a fourth condition when there is no first depth value d1 satisfying the third condition in the histogram, wherein the fourth condition refers to: d1 is greater than $d_{min}$ but is less than D; the number of pixel points corresponding to d1 is greater than or equal to the number of pixel points corresponding to each of the depth values between $d_{min}$ and D; and determining the second depth value d2 is $d_{max}$ when there is the first depth value d1 satisfying the fourth condition in the histogram.

15. The computer device according to claim 9, wherein the M number of third depth values d3 form an arithmetic progression, a tolerance value of the arithmetic progression equals a value that is obtained by dividing a special value by (M−1), and the special value is an absolute value of a difference between the first depth value d1 and the second depth value d2; wherein a minimum depth value of the M number of third depth values d3 is a smaller one of d1 and d2, and a maximum depth value of the M number of third depth values d3 is a bigger one of d1 and d2.

16. The computer device according to claim 9, wherein the blurring of the static image according to each of the M number of third depth values d3 comprises:

blurring the pixel point of which the depth value is not equal to the each of the M number of third depth values d3, and not blurring the pixel point of which the depth value is equal to the each of the M number of third depth values d3, and generating a blurred image corresponding to the each of the M number of third depth values d3, wherein a degree of blurring of any one pixel point of the static image is proportional to a difference value between the depth value of the any one pixel point and the each of the M number of third depth values d3.

* * * * *